March 16, 1926.
B. JASSEN
AUTOMOBILE WIND DEFLECTOR
Filed March 27, 1922
1,577,258
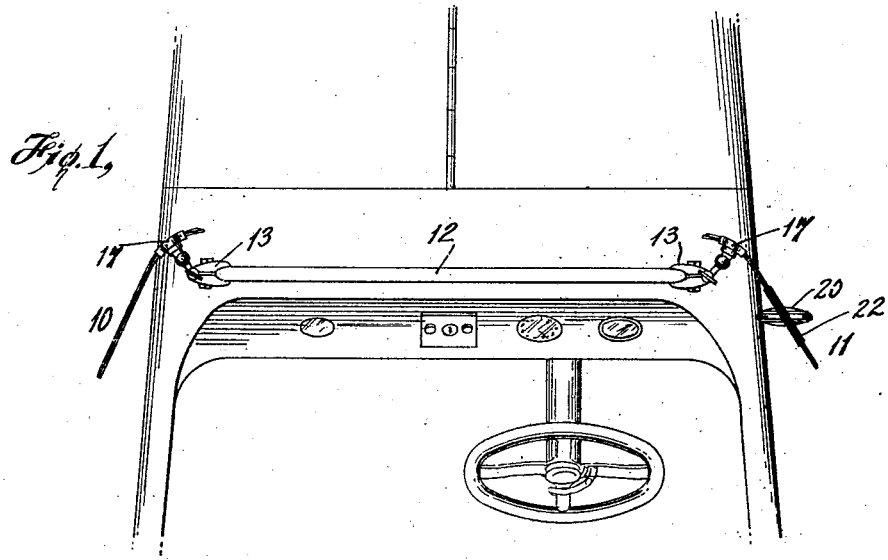
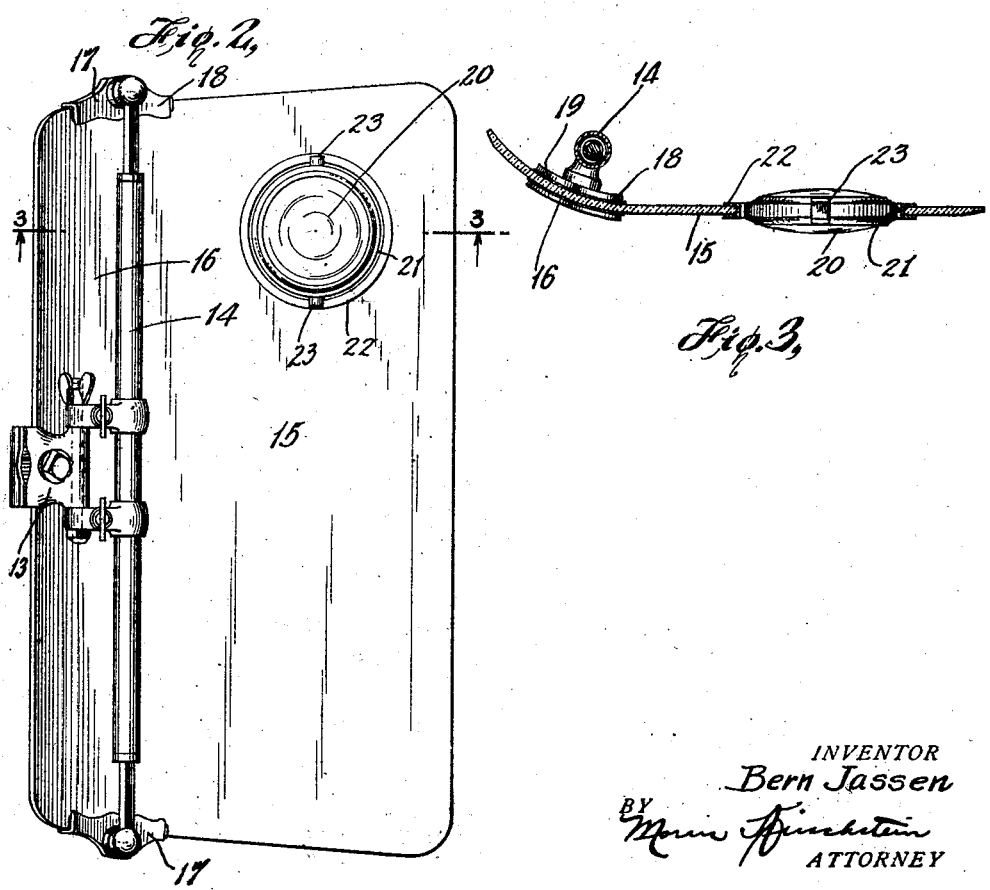
INVENTOR
Bern Jassen
BY
ATTORNEY Patented Mar. 16, 1926.

1,577,258

UNITED STATES PATENT OFFICE.

BERN JASSEN, OF NEW YORK, N. Y.

AUTOMOBILE WIND DEFLECTOR.

Application filed March 27, 1922. Serial No. 547,025.

*To all whom it may concern:*

Be it known that BERN JASSEN, citizen of the United States, residing at New York city, in the county of Kings and State of New York, has invented certain new and useful Improvements in Automobile Wind Deflectors, of which the following is a specification.

This invention relates to wind deflectors for automobiles.

Among the objects thereof is to provide a wind deflector which shall afford a large field of vision, shall be neat and simple in construction and efficient in operation.

Another object of the invention is to provide a device of the character described adapted to be mounted at the side of the automobile and having a glass deflector of curved cross-section which aids materially in keeping the glass clear due to the sweeping action of the air thereagainst and permits the regulation of the air for ventilating the automobile from the side thereof.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a plan view showing the front portion of an automobile with a pair of wind deflectors embodying this invention attached thereto;

Fig. 2 is a vertical elevational view of a wind deflector embodying this invention; and Fig. 3 is a cross-sectional view taken along line 3—3 of Fig. 2.

Referring in detail to the drawing, there is illustrated in Fig. 1 a pair of wind deflectors 10, 11, made in accordance with the invention, secured to the sides of the frame 12 of the front wind shield by means of clamp members 13 extending from brackets 14.

The wind deflector embodying this invention is formed from plate glass having a larger flat portion 15 and a curved portion 16, so that when the wind deflector is in position as shown in Fig. 1, the occupant of the automobile has an increased field of vision, his eye being able to see through to the side by means of the flat portion 15 and a little further somewhat in front by means of the curved portion 16, as will be readily understood. It has been found that the provision of glass having a curved portion in place of a plane glass when used as a side wind deflector aids materially in keeping the glass free from dust because with the curved glass the air is always caused to sweep along the surface thereof and thereby act as a wiper, whereas with the plane glass the tendency is only to cut the air with the wiping effect greatly diminished. Also, much better regulation of the ventilation of the air from the side of the car is made possible by adjusting the scooping effect of the curved deflector. The wind deflector is held to the bracket 14 which may be of any suitable construction by means of clamp members 17 adapted to be forced against the upper and lower edges of the glass plate. Each of these clamp members 17 is formed preferably with a flat portion 18 where the clamp engages the flat portion 15 of the deflector and with a curved portion 19, where it engages the curved portion 16 of the deflector. The clamp 13 is swiveled to the bracket 14 so as to permit adjustment of the deflector, and the clamps 17 together with the deflector may further be turned within the bracket 12. A mirror 20 may be provided in an opening 21 in the deflector, and held in rotatable position therein. Preferably a metal bezel or ring 22 is provided which lines the circumference of the opening, and clamping members 23 extending from the mirror and urged against said ring snap the mirror in position.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patents:—

1. An automobile side wind deflector comprising a transparent member having a flat portion terminating at its rear edge and a curved portion at its forward edge, and means to adjustably mount said transparent member at one side of the wind-shield with the curved portion in advance of the wind-shield, the transparent member being adjustable to one position to dispose the curved portion to overlap in front of the wind-shield with the flat portion extending angularly outward and to be disposed in another position with the curved portion spaced laterally from the wind-shield to catch air and with the flat portion extending angularly inwardly to direct the air into the vehicle.

2. In combination with a wind-shield of an automobile, brackets carried by the wind-shield, supporting members adjustably mounted on said brackets, and a transparent member carried by the supporting members having a main flat portion terminating at its rear edge and an inwardly curved portion at its forward edge, the supporting members being adjustable to one position to dispose the transparent member with its curved forward edge overlapping in front of the wind-shield and the flat portion extending angularly outward and to another position to dispose the transparent member with the curved portion spaced laterally outwardly from the wind-shield and the flat portion extending angularly inwardly and rearwardly therefrom.

3. An automobile side wind deflector comprising a transparent member having a flat body portion terminating at its rear edge and a curved portion terminating at the forward edge, and a mounting bracket including clamp members adapted to grip and embrace the upper and lower edges of said transparent member over a part of the flat and curved portions to thus hold the transparent member against displacement and shifting.

In testimony whereof I affix my signature.

BERN JASSEN.